US011050248B2

(12) United States Patent
Jiang et al.

(10) Patent No.: US 11,050,248 B2
(45) Date of Patent: Jun. 29, 2021

(54) OPTIMIZATION MODEL FOR QUICK TRACK OF SVSR BOUNDARY OF POWER SYSTEM

(71) Applicant: NORTHEAST ELECTRIC POWER UNIVERSITY, Jilin (CN)

(72) Inventors: Tao Jiang, Jilin (CN); Xue Li, Jilin (CN); Haoyu Yuan, Jilin (CN); Houhe Chen, Jilin (CN); Guoqing Li, Jilin (CN); Mingyu Zhang, Jilin (CN); Xiaohui Li, Jilin (CN); Rufeng Zhang, Jilin (CN); Changjiang Wang, Jilin (CN); Song Zhang, Jilin (CN)

(73) Assignee: NORTHEAST ELECTRIC POWER UNIVERSITY, Jilin (CN)

( * ) Notice: Subject to any disclaimer, the term of this patent is extended or adjusted under 35 U.S.C. 154(b) by 0 days.

(21) Appl. No.: 16/338,468

(22) PCT Filed: May 29, 2018

(86) PCT No.: PCT/CN2018/088797
§ 371 (c)(1),
(2) Date: Mar. 30, 2019

(87) PCT Pub. No.: WO2019/033820
PCT Pub. Date: Feb. 21, 2019

(65) Prior Publication Data
US 2020/0169084 A1 May 28, 2020

(30) Foreign Application Priority Data
Aug. 17, 2017 (CN) .......................... 201710706048.8

(51) Int. Cl.
*G05B 19/042* (2006.01)
*H02J 3/00* (2006.01)

(52) U.S. Cl.
CPC .............. *H02J 3/00* (2013.01); *G05B 19/042* (2013.01); *G05B 2219/2639* (2013.01); *H02J 2203/20* (2020.01)

(58) Field of Classification Search
CPC .......... H02J 3/00; H02J 2203/20; H02J 3/001; H02J 3/24; H02J 13/00; H02J 3/0012;
(Continued)

(56) References Cited

U.S. PATENT DOCUMENTS 5,642,000 A * 6/1997 Jean-Jumeau ........ H02J 3/1871
307/31
5,745,368 A * 4/1998 Ejebe ........................ H02J 3/00
307/102
(Continued)

FOREIGN PATENT DOCUMENTS

CN     101247045 A     8/2008
CN     103248049 A     8/2013
(Continued)

OTHER PUBLICATIONS

Published International Application PCT/CN2018/088797.
(Continued)

*Primary Examiner* — Darrin D Dunn
(74) *Attorney, Agent, or Firm* — Dragon Sun Law Firm, PC; Tinggao Li, Esq.

(57) ABSTRACT

There is provided an optimization model and methods for quick track of a Static Voltage Stability Region (SVSR) boundary of a power system. The methods include using a base power flow as a starting point to track a first power system SNB point by a traditional OPF and mapping the SNB point to obtain an SVSR boundary point, and includes repetitively changing a power stress direction to a new direction and tracking a power system SNB point in the new power stress direction and mapping the power system SNB
(Continued)

point to obtain a new SVSR boundary point, and includes returning to the first power system SNB point if the power stress direction angle is ≤0; repetitively changing the power stress direction to a new direction and tracking a power system SNB point and mapping the power system SNB point to obtain a new SVSR boundary point.

6 Claims, 5 Drawing Sheets

(58) Field of Classification Search
CPC .......... G05B 19/042; G05B 2219/2639; Y04S 40/20; Y04S 10/50; Y02E 60/00; Y02E 40/70; G06Q 50/06; G06F 2119/06; G06F 11/30
See application file for complete search history.

(56) References Cited

U.S. PATENT DOCUMENTS

| | | | | |
|---|---|---|---|---|
| 5,796,628 A * | 8/1998 | Chiang | ................... | H02J 3/14 700/295 |
| 6,219,591 B1 * | 4/2001 | Vu | ....................... | G01R 31/085 700/286 |
| 6,249,719 B1 * | 6/2001 | Vu | ........................... | H02J 3/24 700/292 |
| 6,496,757 B1 * | 12/2002 | Flueck | ................. | H02H 1/0092 700/292 |
| 8,024,076 B2 * | 9/2011 | Schlueter | ................. | H02J 3/00 700/286 |
| 2003/0144802 A1 * | 7/2003 | Fulczyk | .................... | H02J 3/24 702/57 |
| 2005/0160128 A1 * | 7/2005 | Fardanesh | .......... | G06F 30/3323 708/446 |
| 2006/0047370 A1 * | 3/2006 | Chu | ........................ | H02J 3/00 700/292 |
| 2009/0228154 A1 * | 9/2009 | Trias | ...................... | G01R 21/00 700/295 |
| 2012/0179301 A1 * | 7/2012 | Aivaliotis | ................. | H02J 3/00 700/286 |
| 2014/0032138 A1 * | 1/2014 | Shrestha | ................. | G06F 11/30 702/58 |
| 2014/0156094 A1 * | 6/2014 | Trias | ................ | H02J 3/00 700/291 |
| 2018/0269681 A1 * | 9/2018 | Vaiman | ..................... | H02J 3/16 |
| 2018/0375329 A1 * | 12/2018 | Kuroda | ............. | H02J 13/00002 |
| 2020/0021133 A1 * | 1/2020 | Liu | .................... | G01R 19/2513 |

FOREIGN PATENT DOCUMENTS

| | | |
|---|---|---|
| CN | 105048468 A | 11/2015 |
| CN | 107133406 A | 9/2017 |
| CN | 107332240 A | 11/2017 |
| CN | 107529644 A | 1/2018 |
| CN | 107749621 A | 3/2018 |
| CN | 107968399 A | 4/2018 |

OTHER PUBLICATIONS

Written Opinion of the International Search Authority of PCT/CN2018/088797.
International Search Report of PCT/CN2018/088797.

* cited by examiner

OPTIMIZATION MODEL FOR QUICK TRACK OF SVSR BOUNDARY OF POWER SYSTEM

CROSS REFERENCE TO RELATED TO RELATED APPLICATIONS

This application is a national stage application of PCT Application No. PCT/CN 2018/088797. This Application claims priority from PCT Application No. PCT/CN2018/088797, filed May 29, 2018, and CN Application No. 201710706048.8, filed Aug. 17, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technical Field

The present disclosure relates to the technical field of voltage stability region boundaries, and in particular relates to an accurate, quick and efficient track of a static voltage stability region of a power system based on an optimization model.

Background of the Present Disclosure

With the increasing tension of environment problems, power systems are required to quicken primary energy transformation and less depend on fossil fuels while providing sustained, reliable and high-quality electrical energy. Recently, with the technical improvement of high-power electronic devices, the high voltage direct current (HVDC) transmission technology reduces the cost and further improves the flexibility of power transmission, and provides conditions for the large-scale renewable energy grid connection and the long-distance transmission, so that the power systems rapidly develop in a green and intelligent manner. Meanwhile, the high-permeability renewable energy grid connection and the power electronization of power systems increase the randomness of injection power and the strong coupling of AC/DC networks, resulting in huge changes in operating characteristics of traditional power systems as well as more complex and changeable operating conditions and increasing the difficulty of voltage stability assessment of power systems. Therefore, it is of great significance to study voltage stability assessment methods suitable for large-scale renewable energy grid connection and the power electronization of power systems. The volatility, randomness and uncertainty of renewable energy sources bring a new challenge to the static voltage stability assessment of power systems.

The Static Voltage Stability Region (SVSR) is an operating region in which the system has static voltage stability under the determined network topology and parameters, and is an important tool for the analysis and assessment of the static voltage stability of a power system containing random and uncertain factors. Although the voltage stability of the power system under multiple uncertain and random factors can be comprehensive and intuitive by the SVSR, tracking the SVSR boundary is the key to construct the SVSR.

At present, the track of the SVSR boundary is mainly realized by a fitting method based on the Continuation Power Flow (CPF) and a hyper-plane approximation method.

1. The fitting method can construct a high-accuracy SVSR with low computational efficiency.

2. The hyper-plane approximation method improves the SVSR construction efficiency, but the constructed SVSR is highly conservative. In addition, since the boundary has extremely complex topological characteristics, it is difficult to depict or obtain a general conclusion of accurate approximation by a unified hyper-plane analysis expression. Therefore, it is necessary to achieve accurate, fast, efficient and universal SVSR construction methods.

Therefore, a heretofore unaddressed need exists in the art to address the aforementioned deficiencies and inadequacies.

SUMMARY OF THE PRESENT DISCLOSURE

The present disclosure provides an optimization model for quick track of an SVSR boundary of a power system. The present disclosure not only inherits the characteristic of high-accuracy track of Saddle Node Bifurcation (SNB) points by the traditional Optimal Power Flow (OPF) model, but also effectively reduces the time required to track a single SNB point and significantly improves the SVSR construction efficiency of the power system. The detailed description will be given hereinafter.

An optimization model and method for quick track of a Static Voltage Stability Region (SVSR) boundary of a power system is provided. The method of track the SVSR boundary includes the following steps:

1) using a base power flow as a starting point, tracking a first power system Saddle Node Bifurcation (SNB) point by a traditional Optimal Power Flow (OPF), and mapping the first power system SNB point to a two-dimensional active power injection space to obtain an SVSR boundary point;

2) repetitively changing a power stress direction to a direction where a power stress direction angle is decreased, tracking a power system SNB point in the new power stress direction by an optimization model, and mapping the power system SNB point to the two-dimensional active power injection space to obtain a new SVSR boundary point; and, returning to the first power SNB point if the power stress direction angle is less than or equal to 0;

3) repetitively changing the power stress direction to a direction where the power stress direction angle is increased, tracking a power system SNB point in the new power stress direction again, and mapping the power system SNB point to the two-dimensional active power injection space to obtain a new SVSR boundary point; and 4) if the new power stress direction angle is greater than or equal to 90°, sequentially connecting all the SVSR boundary points to obtain an SVSR boundary.

The step of tracking a first power system SNB point by a traditional OPF and mapping the first power system SNB point to a two-dimensional active power injection space is specifically:

mapping the first power system SNB point to a two-dimensional active power injection space that uses the active injection power at a bus i and the active injection power at a bus j as horizontal and vertical coordinate axes, respectively.

The power stress direction angle is specifically:

$$\beta = \arctan\frac{\Delta P_j}{\Delta P_i} - \Delta\beta$$

where $\Delta\beta$ is the step size of the power stress direction angle, and $\Delta P_{i0}=\Delta P_i$ and $\Delta P_{j0}=\Delta P_j$ are defined as representing active power components corresponding to the buses i and j in the power stress direction corresponding to the previous power system SNB point, respectively.

The optimization model is:

$$\min -\eta_k$$

$$s.t.\ g(x_{k-1})+\eta_k\lambda_{k-1}d_k=0$$

where k is the $k^{th}$ power system SNB point to be tracked; $\lambda_{k-1}$ is the known load margin corresponding to the $(k-1)^{th}$ power system SNB point; $x_{k-1}$ is the vector of the system state variable corresponding to the $(k-1)^{th}$ power system SNB point; $\eta_k$ is a new state variable during the track of the $k^{th}$ power system SNB point to be tracked; $d_k$ is the $k^{th}$ power stress direction; and, $g(x_{k-1})$ is the power flow equation during the $(k-1)^{th}$ track.

The new power stress direction is:

$$d_{2-}=[\Delta P_1 \ldots \Delta P_{i-1},\Delta P_i,\Delta P_{i+1} \ldots \Delta P_{j-1},\Delta P_j,\\ \Delta P_{j+1} \ldots \Delta P_n,\Delta Q_1 \ldots \Delta Q_l]^T$$

$$\Delta P_i = \sqrt{\Delta P_{i0}^2+\Delta P_{j0}^2}\cos\beta$$

$$\Delta P_j = \sqrt{\Delta P_{i0}^2+\Delta P_{j0}^2}\sin\beta$$

where $\Delta P_i$ to $\Delta P_n$ denote active power components of PV and PQ buses in the power stress direction; $\Delta Q_1$ to $\Delta Q_l$ denote reactive power components of PQ bus in the power stress direction; and, $\Delta P_i$ and $\Delta P_j$ denote active power components corresponding to the buses i and j in the power stress direction, respectively.

The new power stress direction angle is specifically:

$$\beta = \arctan\frac{\Delta P_j}{\Delta P_i} + \Delta\beta$$

where $\Delta\beta$ is the step size of the power stress direction angle, and $\Delta P_{i0}=\Delta P_i$ and $\Delta P_{j0}=\Delta P_j$ represent active power components corresponding to the buses i and j in the power stress direction corresponding to the previous power system SNB point, respectively.

The technical solutions of the present disclosure have the following beneficial effects.

1. A next SNB point to be solved is tracked by using the known SNB on the SVSR boundary as an initial point and using the related information of this initial point as the initial value of the mentioned optimization model, so that the quick track of the SVSR boundary of the power system in the two-dimensional active power injection space can be realized.

2. Compared with the computational efficiency of the existing SVSR construction methods based on CPF or OPF, this method provided in the present disclosure greatly reduces the computation time required to construction the SVSR of the power system, and significantly improves the construction efficiency of the SVSR of the power system with higher accuracy.

3. This method is applicable to the construction of voltage stability regions of actual power system, and can further improve the sensing capabilities to the voltage stability state of large power grids in comparison to the existing methods.

BRIEF DESCRIPTION OF THE DRAWINGS

The accompanying drawings illustrate one or more embodiments of the present disclosure and, together with the written description, serve to explain the principles of the disclosure. Wherever possible, the same reference numbers are used throughout the drawings to refer to the same or like elements of an embodiment.

DETAILED DESCRIPTION OF EMBODIMENTS

Figure 1:
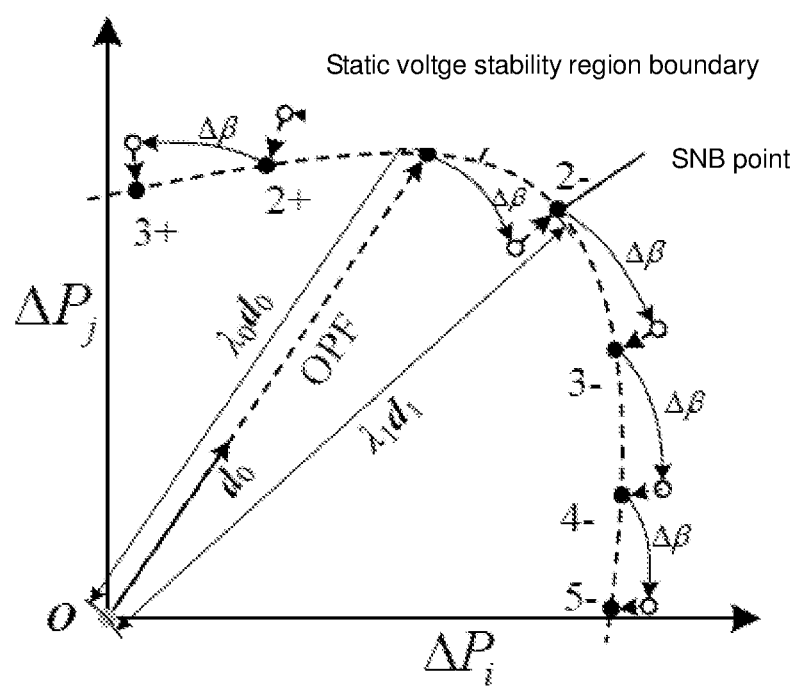
FIG. 1 is a schematic diagram of tracking an SVSR boundary by an optimization model according to the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the disclosure to those skilled in the art. Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the disclosure or of any exemplified term. Likewise, the disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It are also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the disclosure.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Embodiments of the disclosure are illustrated in detail hereinafter with reference to accompanying drawings. It should be understood that specific embodiments described herein are merely intended to explain the disclosure, but not intended to limit the disclosure.

To make the objectives, technical solutions and advantages of the present disclosure clearer, the implementations of the present disclosure will be further described below in detail.

In order to realize the accurate, quick and efficient construction of SVSRs of power systems, on the basis of adjacent SNB points on an SVSR boundary of a power system has proximity, the embodiments of the present disclosure provide an optimization model for quick track of an SVSR boundary of a power system.

The optimization model can construct high-accuracy SVSRs in comparison to the OPF model, but it is required to track the SVSR boundary of the power system with a ground state as an initial point, and the time consumption for SNB points are long. Therefore, the present disclosure adopts the known SNB point on the SVSR boundary as an initial point, and uses the related information of this initial point as an initial value of the mentioned optimization model to track a next SNB point to be solved, so that the track efficiency of SNB points is effectively improved.

The SVSR of the power system is a multi-dimensional space enclosed by all SNB points in the system, and allowing the system to operate in the SVSR constructed by using the SNB points as a boundary. This is a necessary condition for maintaining voltage stability. Therefore, the track of the SVSR boundary is equivalent to the track of SNB points of the power system.

Embodiment 1

Figure 2:
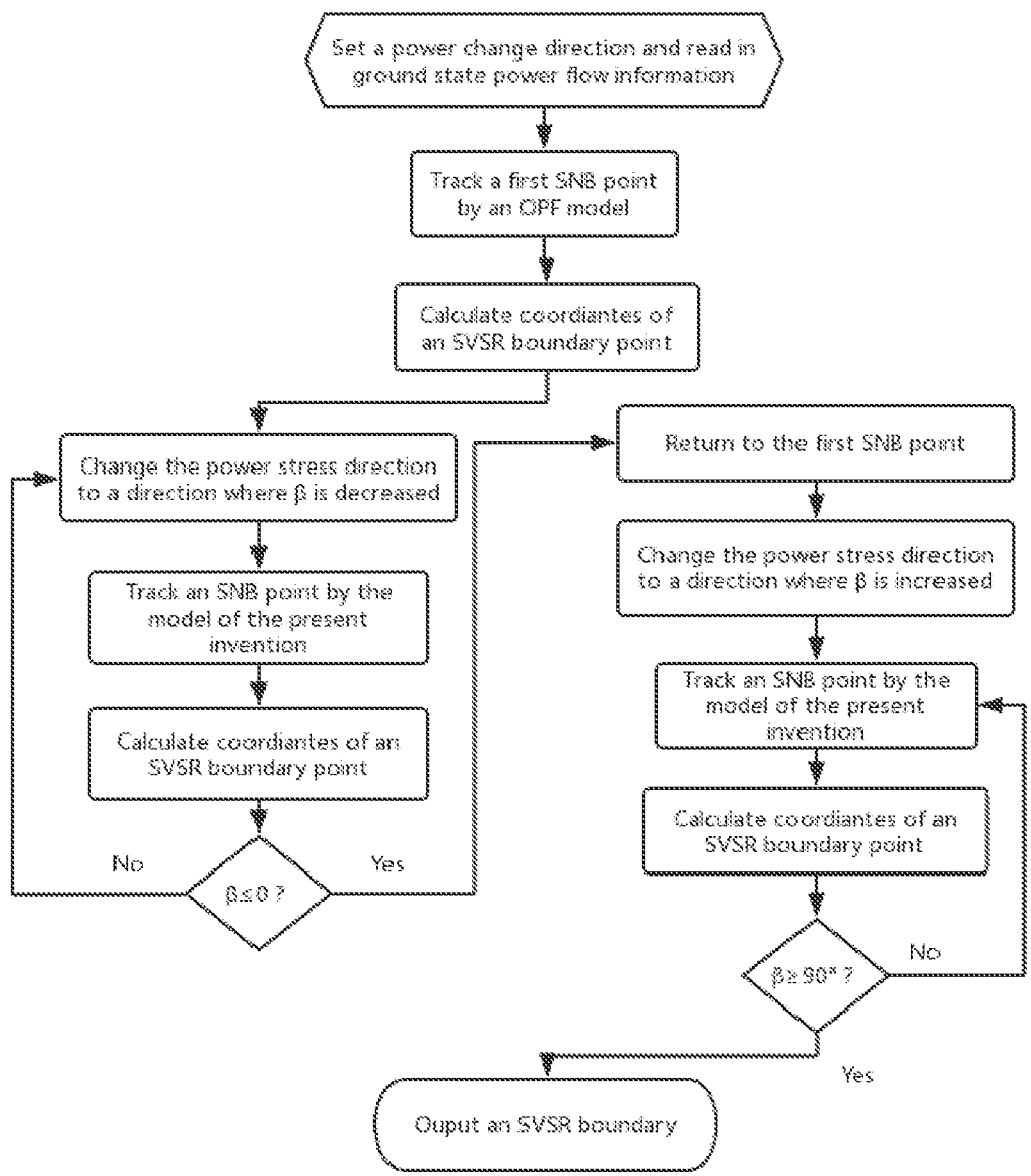
FIG. 2 is a flowchart of tracking an SVSR boundary by the optimization model according to the present disclosure.

This embodiment of the present disclosure provides an optimization model for quick track of an SVSR boundary of a power system, as shown in FIGS. 1, 2, including the following steps:

At step 101: using a base power flow as a starting point, tracking a first power system Saddle Node Bifurcation (SNB) point by a traditional Optimal Power Flow (OPF), and mapping the first power system SNB point to a two-dimensional active power injection space to obtain an SVSR boundary point;

At step 102: repetitively changing a power stress direction to a direction where a power stress direction angle is decreased, tracking a power system SNB point in the new power stress direction by an optimization model; and mapping the power system SNB point to the two-dimensional active power injection space to obtain a new SVSR boundary point, and returning to the first power SNB point if the power stress direction angle is less than or equal to 0;

At step 103: repetitively changing the power stress direction to a direction where the power stress direction angle is increased, tracking a power system SNB point in the new power stress direction again, and mapping the power system SNB point to the two-dimensional active power injection space to obtain a new SVSR boundary point;

At step 104: if the new power stress direction angle is greater than or equal to 90°, sequentially connecting all the SVSR boundary points to obtain an SVSR boundary.

In conclusion, by applying the steps 101 to 104, the embodiment of the present disclosure can track a next power system SNB point to be solved by using the known power system SNB point on the SVSR boundary as an initial point. Moreover, these steps inherits the characteristic of high-accuracy track of power system SNB points by the traditional optimal power flow model, effectively reduce the time required to track a single power system SNB point by the traditional optimal power flow, significantly improving the construction efficiency of the SVSR of the power system.

Embodiment 2

The solutions in Embodiment 1 will be further described below with reference to the specific calculation formulae and accompanying drawings. The detailed description will be given hereinafter.

An optimization model for quick track of an SVSR boundary of a power system including the following steps:

At step 201: By using a base power flow as a starting point, tracking a first power system SNB point by a traditional optimal power flow;

The step 201 includes the following steps:

1). acquiring data including a topological structure of the power system, branch parameters and a state variable x0 of the ground state power flow;

The step of data acquiring is known to those skilled in the art and will not be repeated in this embodiment of the present disclosure;

2) assuming that there are nb+1 buses in the power system, including l PQ (that is, the active power and the reactive power are known) buses and nb−1 PV (that is, the active power and the voltage magnitude are known); wherein the bus No. 0 is a balancing bus, the buses No. 1 to l are PQ buses, and the buses No. l+1 to nb are PV buses; setting a first power stress direction d1 as:

$$d_1 = [\Delta P_1 \ldots \Delta P_{i-1}, \Delta P_i, \Delta P_{i+1} \ldots \Delta P_{j-1}, \Delta P_j, \\ \Delta P_{j+1} \ldots \Delta P_n, \Delta Q_1 \ldots \Delta Q_l]^T \quad (1)$$

where n is the total number of PV buses and PQ buses; $\Delta P_1$ to $\Delta P_n$ denote active power components of PV and PQ buses in the power stress direction; $\Delta Q_1$ to $\Delta Q_l$ denote reactive power components of PQ buses in the power stress direction; $\Delta P_i$ and $\Delta P_j$ denote active power components corresponding to buses i and j in the power stress direction, respectively; and, assuming that $\Delta P_i = \Delta P_j = 1$, and the active power components and reactive power components of the remaining buses in the power stress direction are 0;

3) expressing a model for tracking the first power system SNB point by an optimal power flow as follows:

$$\min -\lambda_1$$

$$s.t.\ g(x_1) + \lambda_1 d_1 = 0 \quad (2)$$

where $x_1$ is the vector of the state variable corresponding to the first power system SNB point; $g(x_1)$ is the traditional power flow equation of the power system; $\lambda_1$ is the power system load margin corresponding to the first power system SNB point; and, $d_1$ is the first power stress direction;

4) using the ground state power flow state variable x0 as an initial value and substituting it into the model for tracking the first power system SNB point by the traditional optimal power flow to obtain (x1, λ1), i.e., state variable information at the first power system SNB point;

At step 202: mapping the obtained power system SNB point to a two-dimensional active power injection space to obtain an SVSR boundary point;

The step 202 includes the following steps:

1). establishing a two-dimensional active power injection space by using the active injection power at a bus I and the active injection power at a bus j as horizontal and vertical coordinate axes, respectively;

2). mapping the state variable $(x_k, \lambda_k)$ of the kth (k=1 when tracking the first power system SNB point) to the two-dimensional active power injection space by using the active injection power at a bus I and the active injection power at a bus j as horizontal and vertical coordinate axes, respectively, to obtain an SVSR boundary point $(\lambda_k \Delta P_i, \lambda_k \Delta P_j)$;

At step 203: repetitively changing the power stress direction to a direction where the first power stress direction angle β is decreased, to obtain a newly changed power stress direction;

The step 203 includes the following steps:

1) defining the first power stress direction angle as:

$$\beta = \arctan \frac{\Delta P_j}{\Delta P_i} - \Delta \beta \quad (3)$$

where Δβ is the step size of the power stress direction angle, and $\Delta P_{i0} = \Delta P_i$ and $\Delta P_{j0} = \Delta P_j$ represent active power components corresponding to the buses i and j in the power stress direction corresponding to the previous power system SNB point, respectively;

2) updating the power stress direction dl to a new power stress direction d2—which is changed to a direction where the first power stress direction angle β is decreased, as shown in the following equation:

$$d_{2-} = [\Delta P_1 \ldots \Delta P_{i-1}, \Delta P_i, \Delta P_{i+1} \ldots \Delta P_{j-1}, \Delta P_j, \Delta P_{j+1} \ldots \Delta P_n, \Delta Q_1 \ldots \Delta Q_l]^T \quad (4)$$

where the values of $\Delta P_i$ and $\Delta P_j$ are separately expressed as:

$$\Delta P_i = \sqrt{\Delta P_{i0}^2 + \Delta P_{j0}^2} \cos \beta \quad (5)$$

$$\Delta P_j = \sqrt{\Delta P_{i0}^2 + \Delta P_{j0}^2} \sin \beta \quad (6);$$

At step 204: tracking a power system SNB point in the new power stress direction by an optimization model for quick track of the SVSR boundary of the power system;

The step 204 includes the following steps:

1) expressing the optimization model for quick track of the SVSR boundary of the power system as:

$$\min -\eta_k \quad (7)$$

$$s.t. \ g(x_{k-1}) + \eta_k \lambda_{k-1} d_k = 0 \quad (8)$$

where k is the $k^{th}$ power system SNB point to be tracked; $\lambda_{k-1}$ is the known load margin corresponding to the $(k-1)^{th}$ power system SNB point; $x_{k-1}$ is the vector of the system state variable corresponding to the $(k-1)^{th}$ power system SNB point; $d_k$ is the $k^{th}$ power stress direction; $g(x_{k-1})$ is the power flow equation during the $(k-1)^{th}$ track; and $\eta_k$ is a new state variable during the track of the $k^{th}$ power system SNB point to be tracked, and $\eta_k$ and $\lambda_{k-1}$ jointly denote the load margin $\lambda_k = \lambda_{x-1} \eta_x$ at the $k^{th}$ power system SNB point to be tracked;

2) using the vector $x_{k-1}$ of the system state variable corresponding to the (k−1)th power system SNB point as an initial value and substituting it into the optimization model for quickly tracking the SVSR boundary of the power system, to obtain $(x_k, \lambda_k - 1 \eta_k)$, i.e., the state variable information at the kth power system SNB point;

At step 205: mapping the new power system SNB point to the two-dimensional active power injection space to obtain a new SVSR boundary point, and performing the step 202 again to verify the value β, if the value β is less than or equal to 0, performing step 206, otherwise returning to the step 203;

The step 205 includes the following steps:

1) performing the step 202 again, that is, establishing a two-dimensional active power injection space by using the active injection power at a bus i and the active injection power at a bus j as horizontal and vertical coordinate axes, respectively; and, mapping the state variable $(x_k, \lambda_k)$ of the kth (k=1 when the first power system SNB point is tracked) to the two-dimensional active power injection space by using the active injection power at the bus i and the active injection power at the bus j as horizontal and vertical coordinate axes, respectively, to obtain an SVSR boundary point $(\lambda_k \Delta P_i, \lambda_k \Delta P_j)$;

2) verifying the value β, if the value β is less than or equal to 0, performing step 206, otherwise returning to the step 203;

At step 206: returning to the process of using the first power system SNB point as a starting point;

Where the step 206 includes the following steps:

1) resetting the power stress direction as a first power stress direction dl:

$$d_l = [\Delta P_1 \ldots \Delta P_{i-1}, \Delta P_i, \Delta P_{i+1} \ldots \Delta P_{j-1}, \Delta P_j, \Delta P_{j+1} \ldots \Delta P_n, \Delta Q_1 \ldots \Delta Q_l]^T \quad (9)$$

where assuming that $\Delta P_i = \Delta P_j = 1$ and the active power components and reactive power components of the remaining buses in the power stress direction are 0;

2) obtaining information $(x_1, \lambda_1)$ of the first power system SNB point;

At step 207: repetitively changing the power stress direction to a direction where the second power stress direction angle is increased;

The step 207 includes the following steps:

1) defining the second power stress direction angle as:

$$\beta' = \arctan \frac{\Delta P_j}{\Delta P_i} + \Delta \beta \quad (10)$$

where Δβ is the step size of the power stress direction angle, and $\Delta P_{i0} = \Delta P_i$ and $\Delta P_{j0} = \Delta P_j$ represent active power components corresponding to the buses i and j in the power stress direction corresponding to the previous power system SNB point, respectively.

2) updating the power stress direction dl to a new power stress direction d2—which is changed to a direction where the second power stress direction angle is decreased, as shown in the following equation:

$$d_{2+} = [\Delta P_1 \ldots \Delta P_{i-1}, \Delta P_i, \Delta P_{i+1} \ldots \Delta P_{j-1}, \Delta P_j, \Delta P_{j+1} \ldots \Delta P_n, \Delta Q_1 \ldots \Delta Q_l]^T \quad (11)$$

where the values of $\Delta P_i$ and $\Delta P_j$ are separately expressed as:

$$\Delta P_i = \sqrt{\Delta P_{i0}^2 + \Delta P_{j0}^2} \cos \beta' \quad (12)$$

$$\Delta P_j = \sqrt{\Delta P_{i0}^2 + \Delta P_{j0}^2} \sin \beta' \quad (13).$$

At step 208: performing the steps 204 and 202:

The step 208 includes the following steps:

1) performing the step 204, i.e., tracking a power system SNB point in the new power stress direction by the optimization model for quick track of the SVSR boundary of the power system;

2) performing the step 202, i.e., establishing a two-dimensional active power injection space by using the active injection power at a bus i and the active injection power at a bus j as horizontal and vertical coordinate axes, respectively; and, mapping the state variable (xk, λk) of the kth (k=1 when the first power system SNB point is tracked) to the two-dimensional active power injection space by using the active injection power at the bus i and the active injection power at the bus j as horizontal and vertical coordinate axes, respectively, to obtain an SVSR boundary point $(\lambda_k \Delta P_i, \lambda_k \Delta P_j)$;

At step 209: if the value β' is greater than or equal to 90°, sequentially connecting all the obtained SVSR boundary points to obtain an SVSR boundary, and ending the process; otherwise, returning to the step 207.

In conclusion, by applying the steps 201 to 209, the embodiment of the present disclosure inherits the characteristic of high-accuracy track of SNBs by the traditional OPF model, effectively reduces the time required to track a single SNB point, and significantly improves the construction efficiency of the SVSR of the power system.

Embodiment 3

The feasibility of the solutions in Embodiments 1 and 2 will be verified below by specific examples. The detailed description will be given below.

Figure 3:
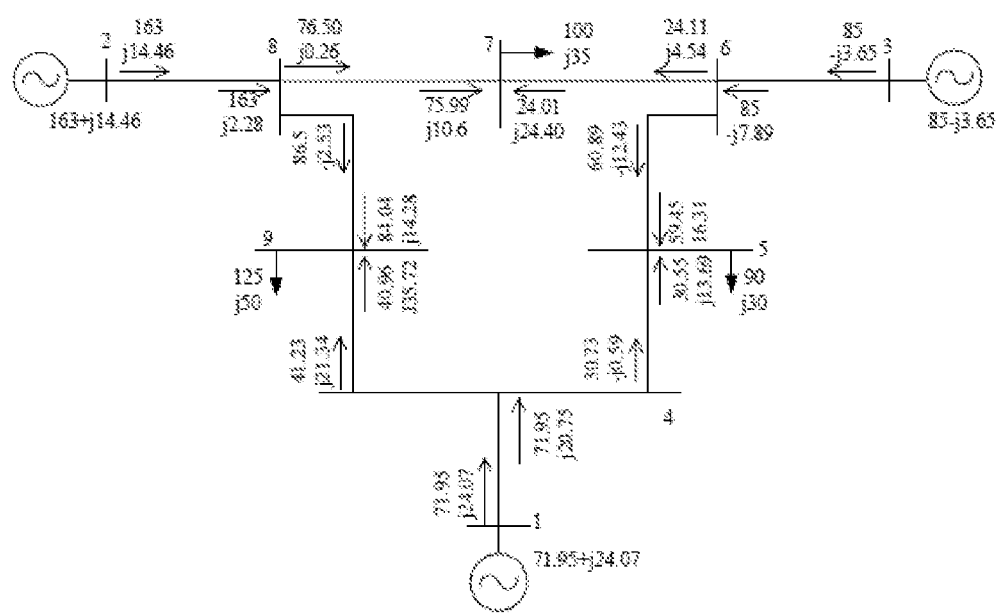
FIG. 3 is a diagram showing a Western Electricity Coordinating Council (WECC) 3-generator-9-bus test system.
Figure 4:
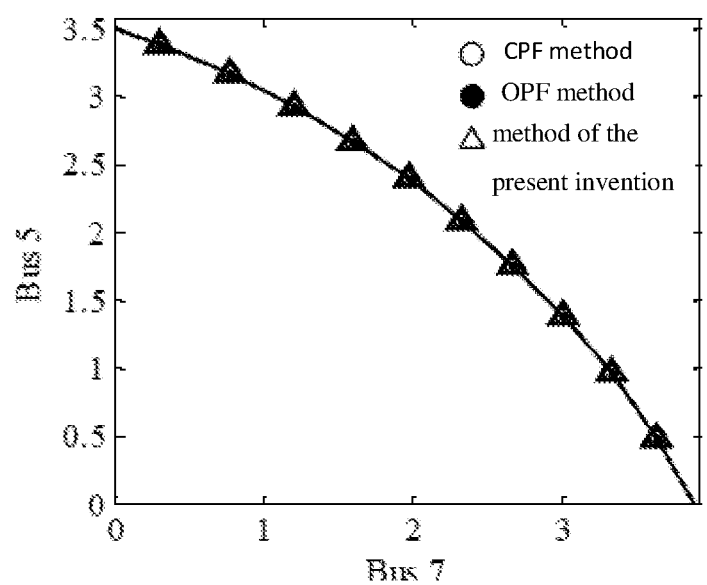
FIG. 4 is a schematic diagram of an SVSR in which the coordinate axis of the WECC 3-generator-9-bus system is active power consumptions of load buses.

In this example, the effectiveness of this method is verified by taking tracking an SVSR boundary of a WECC 3-genertor-9-bus system as example. The WECC 3-genertor-9-bus test system is shown in FIG. 3. The steps are as follows:

Taking load buses 5 and 7 as voltage stability key buses, using the active power injection at the bus 5 and the active power injection at the bus 7 as coordinate axes, and tracking an SVSR boundary in a two-dimensional active load injection space by the optimization model provided by this method;

Setting a step size of the power stress direction angle as Δβ=0.15 rad, and the convergence precision as $10^{-8}$; using the ground state as an initial point, obtaining the initial power stress direction as $d_5=[\Delta S_{d2}, \Delta S_{d3}, \Delta S_{d4}, \Delta S_{d5}, \Delta S_{d6}, \Delta S_{27}, \Delta S_8, \Delta S_{d9}]^T=[0,0,0,0.6690,0,0.7433,0,0]^T$, and the corresponding power stress direction angle as $\square_5\square 0.7328$ rad; By the optimization model shown by equation (4) and along the initial power stress direction $d_5$, tracking and obtaining a maximum system load margin $\lambda_5=2.3233$ satisfying the optimal solution of the equation (4); the operating point of which corresponds to an SNB point 5 in FIG. 4, at coordinates (2.3233,2.0910);

Further, obtaining $\beta_4=0.5828$ rad by values $d_5$, $\beta_5$ and Δβ, and the corresponding power stress direction is $d_4=[0,0,0, 0.5504,0,0.8349,0,0]^T$; using the SNB point 5 as an initial point and $(x_5, \lambda_5)$ as an initial value of the equation (7) and assuming η=1, tracking a next SNB point 4 along a power stress direction $d_4$ by the optimization model shown by equation (7), thus obtaining a target value $\eta_4=1.0208$ satisfying the optimal solution of the equation (7) in the power stress direction $d_4$. The maximum load margin of the system along this direction is $\lambda_4=\eta_4\times\lambda_5=2.3717$, and the coordinates of the SNB point 4 in FIG. 4 are (2.6640,1.7561). In a similar way, by using the previous known SNB point as an initial point and the related information as an initial value of the optimization model shown by equation (7), SNB points are tracked in a direction where the value $\beta_k$ is decreased in the first quadrant of FIG. 4 by this method, so that SNB points 4, 3, 2, 1 and 0 are obtained. The detailed results are shown in Table 1.

TABLE 1

Results of SNB point track based on the present disclosure

| No. | β/rad | η | λ | Coordinates |
| --- | --- | --- | --- | --- |
| 0 | −0.0172 | 1.0700 | 2.9084 | (3.9123, −0.0672) |
| 1 | 0.1328 | 1.0590 | 2.7181 | (3.6246, 0.4843) |
| 2 | 0.2828 | 1.0468 | 2.5667 | (3.3160, 0.9636) |
| 3 | 0.4328 | 1.0339 | 2.4520 | (2.9947, 1.3836) |
| 4 | 0.5828 | 1.0208 | 2.3717 | (2.6640, 1.7561) |
| 5 | 0.7328 | 1.0000 | 2.3233 | (2.3233, 2.0910) |
| 6 | 0.8828 | 0.9923 | 2.3054 | (1.9694, 2.3961) |
| 7 | 1.0328 | 1.0050 | 2.3170 | (1.5973, 2.6769) |
| 8 | 1.1828 | 1.0178 | 2.3581 | (1.2002, 2.9367) |
| 9 | 1.3328 | 1.0303 | 2.4296 | (0.7706, 3.1765) |
| 10 | 1.4828 | 1.0424 | 2.5325 | (0.2994, 3.3939) |
| 11 | 1.6328 | 1.0535 | 2.6679 | (−0.2225, 3.5824) |

It can be known from the coordinates of each SNB point in Table 1 that the SNB point 0 is located outside the first quadrant of FIG. 4, and correspondingly β≤0. It is indicated that SNB points of the system are tracked from the initial SNB point 5 in the first quadrant of the two-dimensional active power injection space along a direction where β is decreased. In this case, it is necessary to return to the initial SNB point 5 and then continuously track SNB points in the first quadrant of the active power injection space along a direction where β is increased. By a similar way, tracking SNB points in a direction where β is decreased, SNB points 6, 7, 8, 9 and 10 till to SNB point 11 by this method along a direction where β is increased. At this time, $\beta_{11}>\pi/2$, and the track of SNB points along the direction where β is increased ends. So far, all SNB points tracked in the first quadrant of the two-dimensional active power injection space by the optimization model provided in this method are shown in FIG. 4. All the SNB points in FIG. 4 are connected one by one to obtain an SVSR boundary of the buses 5 and 7 in the first quadrant of the active power injection space.

To verify the correctness of the SVSR boundary tracked by the optimization model provided in this method, SVSR boundary points in the corresponding growth direction are tracked in the two-dimensional active power injection space shown in FIG. 4 by CPF and OPF, respectively, and the results are shown in FIG. 4. By comparing the SVSR boundary tracked by the optimization model provided by the present disclosure and the SVSR boundaries tracked by CPF and OPF in FIG. 4, it can be known that in the same power stress direction, the SNB points tracked by the present disclosure are approximately overlapped with the SNB points tracked by CPF and OPF, so that the correctness of the SVSR boundary tracked by the present disclosure is verified.

Figure 5:
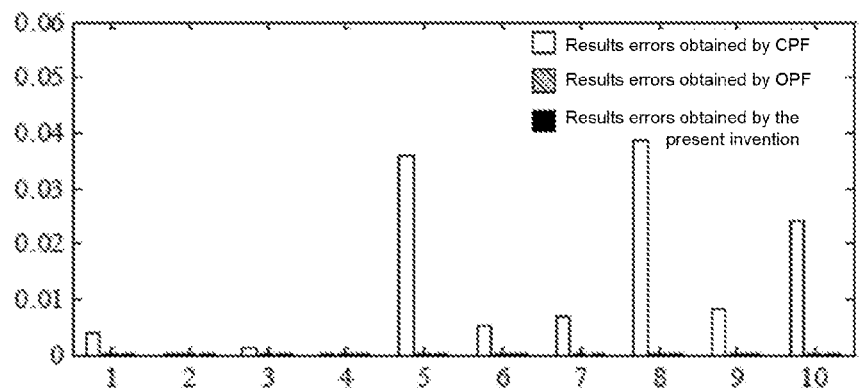
FIG. 5 is a comparison diagram of calculation errors of the SVSR boundary.

It can be known from the features of the SVSR boundary that, at actual SVSR boundary points, the Jacobi matrix of the power flow equation of the power system is singular, so that the minimum feature value of the Jacobi matrix is 0. By comparing the errors between the SVSR boundary points obtained by the three SVSR boundary track algorithms and the actual SVSR boundary points, the calculation accuracy of each algorithm can be evaluated by calculating and comparing the minimum feature value of the Jacobi matrix of the power flow equation at the obtained SVSR boundary points. FIG. 5 shows the minimum feature values of the Jacobi matric of the power flow equation at the boundary SVSR boundary points obtained by each of the CPF, the OPF and the optimization model in this method in an occasion 1, respectively. From the comparison of the minimum feature values of the SNB points in FIG. 5, it can be known that the accuracy of the SNB points tracked by the present disclosure and the OPF is far higher than that of the SNB points traced by CPF. In the SNB points tracked by the CPF, the minimum feature value is $1.3256 \times 10^{-4}$, the maximum value is $3.85 \times 10^{-2}$, and the average minimum feature value is $1.06 \times 10^{-2}$. However, the average minimum feature values obtained by the optimization model of the present disclosure and the OPF are $5.6286 \times 10^{-7}$ and $2.1656 \times 10^{-7}$, respectively, and the calculation accuracy of the two algorithms are approximately equal and far higher than that of the CPF. The main reason for the above results is as follows: during the track of SNB points by the CPF, the ground state is used as a starting point and trace the "apex point" of the PV (active power-voltage) curve by continuous prediction-correction, and this point is then used as the tracked SNB point. However, due to the limitations to the algorithm principle and the computational efficiency, the SNB points tracked by the CPF might cross or not reach the real SNB points. Therefore, it cannot be guaranteed that all SNB points in any power stress direction are actual SNB points, thus resulting in a large accuracy fluctuation of the SNB points obtained by the CPF calculation. Even if the step size in the CPF calculation is shortened so as to more densely distribute the obtained calibration points on the PV curves, it is also difficult to eliminate the errors. In addition, a too small calculation step size will greatly degrade the computational efficiency of the CPF. When the SNB points are solved by the optimization algorithm, by directly solving a model for accurately describing SNB points, a situation where the SNB points cross or does not reach the real SNB points can be avoided, and the accuracy of the obtained SNB points depends on the convergence conditions set by the optimization algorithm. The results of comparison show that, in the active load injection space, the accuracy of the optimization model in this method is the same as that of the OPF and far higher than that of the CPF, so that the feasibility of this method is verified.

Unless the model numbers of devices are specified in the embodiments of the present disclosure, the model numbers of other devices are not limited as long as the above functions can be realized.

Figure 6:
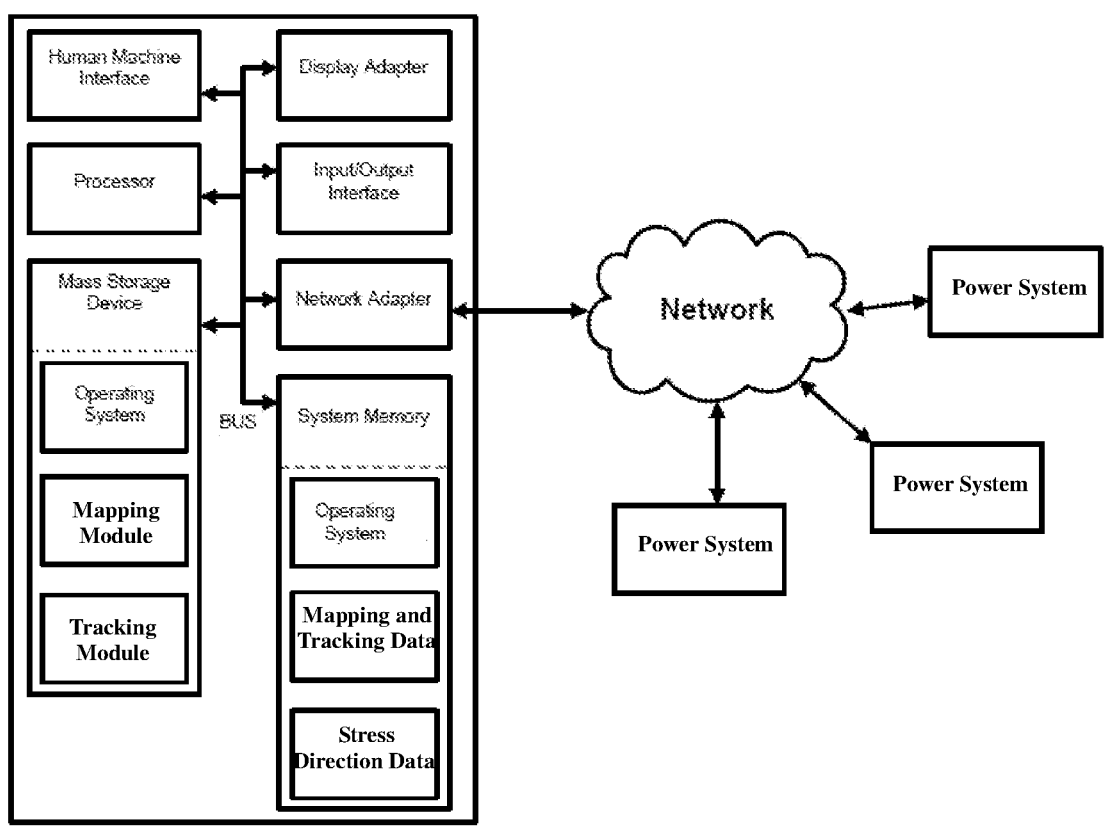
FIG. 6 is a block diagram illustrating a computing system in which the present system and method can operate.

Referring to FIG. 6, the methods and systems of the present disclosure can be implemented on one or more computers. The methods and systems disclosed can utilize one or more computers to perform one or more functions in one or more locations. The processing of the disclosed methods and systems can also be performed by software components. The disclosed systems and methods can be described in the general context of computer-executable instructions such as program modules, being executed by one or more computers or devices. For example, the program modules include operating modules such as a mapping module, a tracking module, and the like. The mapping module is configured to map a power system SNB point (e.g., a first power system SNB point) to a two-dimensional active power injection space to obtain an SVSR boundary point and repetitively changing a power stress direction to a new direction where a power stress direction angle is decreased. The tracking module is configured to track a power system SNB point in a new power stress direction by an optimization model. These program modules can be stored on the mass storage device of one or more computers devices co-located with a power system or remotely located respect to a power system. Each of the operating modules can comprise elements of the programming and the data management software.

The components of the one or more computers can comprise, but are not limited to, one or more processors or processing units, a system memory, a mass storage device, an operating system, a system memory, an Input/Output Interface, a display device, a display interface, a network adaptor, and a system bus that couples various system components. The one or more computers and one or more power system can be implemented over a wired or wireless network connection at physically separate locations, implementing a fully distributed system. By way of example, the one or more computers can be a personal computer, a portable computer, a smart device, a network computer, a peer device, or other common network node, and so on. Logical connections between one or more computers and one or more power systems can be made via a network, such as a local area network (LAN) and/or a general wide area network (WAN).

Those skilled in the art should understand that the accompanying drawings are schematic diagrams of a preferred embodiment, and the serial numbers of the embodiments of the present disclosure are merely descriptive and do not indicate the priority of the embodiments.

The forgoing description merely shows preferred embodiments of the present disclosure and is not intended to limit the present disclosure. Any modification, equivalent replacement and improvement without departing from the spirit and principle of the present disclosure shall fall into the protection scope of the present disclosure.

What is claimed is:

1. An optimization method for quick track of a Static Voltage Stability Region (SVSR) boundary of a power system, comprising the following steps of:

by using a base power flow as a starting point, tracking, executed by a processor, a first power system Saddle Node Bifurcation (SNB) point by an Optimal Power Flow (OPF), and mapping the first power system SNB point, executed by the processor, to a two-dimensional active power injection space to obtain an SVSR boundary point;

repetitively changing, executed by the processor, a power stress direction to a new direction where a power stress direction angle is decreased, tracking, executed by the processor, a power system SNB point in the new power stress direction by an optimization model, and mapping the power system SNB point to the two-dimensional active power injection space to obtain a new SVSR boundary point; and returning, executed by the processor, to the first power SNB point if the power stress direction angle is less than or equal to 0;

repetitively changing, executed by the processor, the power stress direction to a new direction where the power stress direction angle is increased, tracking, executed by the processor, a power system SNB point in the new power stress direction again, and mapping, executed by the processor, the power system SNB point to the two-dimensional active power injection space to obtain a new SVSR boundary point; and if the new power stress direction angle is greater than or equal to 90°, sequentially connecting, executed by the processor, all the SVSR boundary points to obtain an SVSR boundary operating the power system by using the SVSR boundary points as the SVSR boundary.

2. The optimization method for quick track of an SVSR boundary of a power system according to claim 1, wherein the step of tracking a first power system SNB point by the OPF and mapping the first power system SNB point to a two-dimensional active power injection space further includes:

mapping, executed by the processor, the first power system SNB point to a two-dimensional active power injection space by using the active injection power at a bus i and the active injection power at a bus j as horizontal and vertical coordinate axes, respectively.

3. The optimization method for quick track of an SVSR boundary of a power system according to claim 1, wherein the power stress direction angle is specifically:

$$\beta = \arctan\frac{\Delta P_j}{\Delta P_i} - \Delta\beta$$

where $\Delta\square$ is the step size of the power stress direction angle, and $\Delta P_{i0}=\Delta P_i$ and $\Delta P_{j0}=\Delta P_j$ represent active power components corresponding to the buses i and j in the power stress direction corresponding to the previous power system SNB point, respectively.

4. The optimization method for quick track of an SVSR boundary of a power system according to claim 1, wherein the optimization model is:

$$\min -\eta_k$$

$$s.t.\ g(x_{k-1})+\eta_k\lambda_{k-1}d_k=0$$

where k is the $k^{th}$ power system SNB point to be tracked; $\square k-1$ is the known load margin corresponding to the $(k-1)^{th}$ power system SNB point; $X_{k-1}$ is the vector of the system state variable corresponding to the $(k-1)^{th}$ power system SNB point; $\square k$ is a new state variable during the track of the $k^{th}$ power system SNB point to be tracked; $d_k$ is the $k^{th}$ power stress direction; and, $g(x_{k-1})$ is the power flow equation during the $(k-1)^{th}$ track.

5. The optimization method for quick track of an SVSR boundary of a power system according to claim 1, wherein the new power stress direction is:

$$d_{2-}=[\Delta P_1 \ldots \Delta P_{i-1}, \Delta P_i, \Delta P_{i+1} \ldots \Delta P_{j-1}, \Delta P_j, \Delta P_{j+1} \ldots \Delta P_n, \Delta Q_1 \ldots \Delta Q_l]^T$$

$$\Delta P_i=\sqrt{\Delta P_{i0}^2+\Delta P_{j0}^2}\cos\beta$$

$$\Delta P_j=\sqrt{\Delta P_{i0}^2+\Delta P_{j0}^2}\sin\beta$$

where $\Delta P_1$ to $\Delta P_n$ denote active power components of PV and PQ buses in the power stress direction; $\Delta Q_1$ to $\Delta Q_l$ denote reactive power components of PQ buses in the power stress direction; and, $\Delta P_i$ and $\Delta P_j$ denote active power components corresponding to the buses i and j in the power stress direction, respectively.

6. The optimization method for quick track of an SVSR boundary of a power system according to claim 1, wherein the new power stress direction angle is:

$$\beta' = \arctan\frac{\Delta P_j}{\Delta P_i} + \Delta\beta$$

where $\Delta\square$ is the step size of the power stress direction angle, and $\Delta P_{i0}=\Delta P_i$ and $\Delta P_{j0}=\Delta P_j$ represent active power components corresponding to the buses i and j in the power stress direction corresponding to the previous power system SNB point, respectively.

\* \* \* \* \*